US 8,056,467 B2

(12) United States Patent
Shahana

(10) Patent No.: US 8,056,467 B2
(45) Date of Patent: Nov. 15, 2011

(54) FLUID PRESSURE APPARATUS FOR A BICYCLE

(75) Inventor: Satoshi Shahana, Osaka (JP)

(73) Assignee: Shimano, Inc., Sakai-ku, Sakai, Osaka (JP)

( * ) Notice: Subject to any disclaimer, the term of this patent is extended or adjusted under 35 U.S.C. 154(b) by 675 days.

(21) Appl. No.: 12/237,600

(22) Filed: Sep. 25, 2008

(65) Prior Publication Data

US 2009/0200716 A1 Aug. 13, 2009

(30) Foreign Application Priority Data

Feb. 7, 2008 (JP) ................................. 2008-027183

(51) Int. Cl.
*B62M 9/12* (2006.01)
*B62M 25/00* (2006.01)

(52) U.S. Cl. ................. 92/131; 92/128; 474/80

(58) Field of Classification Search .................. 92/7, 84, 92/129, 130 R, 131; 474/78, 80
See application file for complete search history.

(56) References Cited

U.S. PATENT DOCUMENTS

| | | | | |
|---|---|---|---|---|
| 3,899,057 | A | * | 8/1975 | Carre ............................... 60/557 |
| 5,890,979 | A | * | 4/1999 | Wendler ........................... 474/82 |
| 6,149,541 | A | | 11/2000 | Nakamura et al. |
| 6,293,881 | B1 | * | 9/2001 | Ichida .............................. 474/80 |
| 6,305,237 | B1 | * | 10/2001 | Ichida .............................. 474/82 |
| 7,389,642 | B2 | * | 6/2008 | Takizawa et al. ............... 60/562 |

FOREIGN PATENT DOCUMENTS

| | | |
|---|---|---|
| DE | 19514267 A1 | 10/1996 |
| DE | 69713692 T2 | 2/2003 |
| DE | 10346104 A1 | 5/2005 |
| DE | 69925059 T2 | 9/2005 |
| DE | 60025567 T2 | 8/2006 |

OTHER PUBLICATIONS

German Search Report for DE 10 2009 005 185.6 the German application that corresponds to this application, dated Dec. 1, 2010.

* cited by examiner

*Primary Examiner* — Thomas E Lazo

(74) *Attorney, Agent, or Firm* — James A. Deland

(57) ABSTRACT

A fluid pressure apparatus for a bicycle comprises a piston, a housing with a chamber dimensioned to receive the piston therein so that the piston can move axially, and first and second fluid ports in fluid communication with the chamber. The first and second fluid ports are located so that the piston is disposed between the first and second fluid ports when the piston is disposed in a piston home position. A first positioning element moves from a first home position towards a first direction, and a first biasing element biases the first positioning element towards the first home position. A first coupling element couples the first positioning element to move with the piston in the first direction, but the first positioning element and the piston move relative to each other when the piston moves in an opposite second direction.

20 Claims, 5 Drawing Sheets

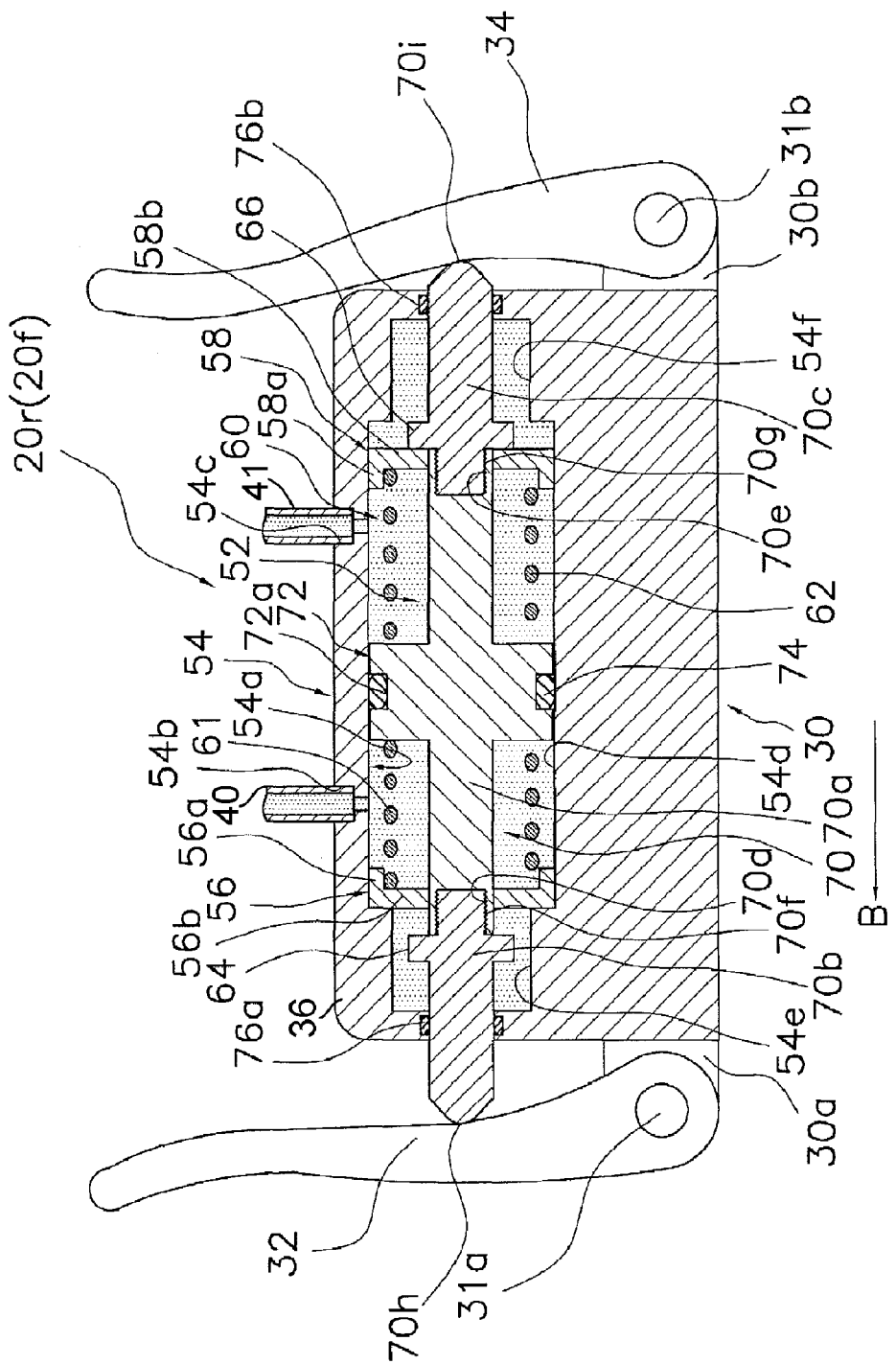

US 8,056,467 B2

FLUID PRESSURE APPARATUS FOR A BICYCLE

BACKGROUND OF THE INVENTION

The present invention is directed to bicycle control devices and, more particularly, to a fluid pressure apparatus for a bicycle.

Some bicycle control devices operate using pressure from a fluid such as air, water, oil, etc. One example of such a device is shown in German Offenlegungsschrift No. 195 14 267. The device disclosed in that document comprises a fluid pressure cylinder, a piston that is axially slidably disposed within the cylinder, a pair of rods that extend from opposite sides of the piston, an actuating member that presses against one of the rods, and a bushing that guides the other rod. First and second fluid ports are located on opposite sides of the piston so that fluid flows through the first fluid port when the actuating member moves the piston in one axial direction, and fluid flows through the second fluid port when the actuating member moves the piston in the opposite direction. As a result, two operations of a control device coupled to the first and second fluid ports can be performed using a single piston and fluid pressure cylinder.

The fluid in the pressure cylinder normally acts as a biasing mechanism, similar to a pair of springs mounted on opposite sides of the piston, that maintains the piston in a desired home position between the first and second fluid ports. However, if the fluid pressure on opposite sides of the piston is unbalanced, then the piston will be located in the improper position relative to the first and second fluid ports. As a result, the actuating member will have to be moved asymmetrically, thereby creating discomfort for the rider.

SUMMARY OF THE INVENTION

The present invention is directed to various features of a fluid pressure apparatus for a bicycle. In one embodiment, a fluid pressure apparatus for a bicycle comprises a piston, a housing with a chamber dimensioned to receive the piston therein so that the piston can move axially, and first and second fluid ports in fluid communication with the chamber. The first and second fluid ports are located so that the piston is disposed between the first and second fluid ports when the piston is disposed in a piston home position. A first positioning element moves from a first home position towards a first direction, and a first biasing element biases the first positioning element towards the first home position. A first coupling element couples the first positioning element to move with the piston in the first direction, but the first positioning element and the piston move relative to each other when the piston moves in an opposite second direction. Additional inventive features will become apparent from the description below, and such features alone or in combination with the above features and their equivalents may form the basis of further inventions as recited in the claims.

BRIEF DESCRIPTION OF THE DRAWINGS

FIG. 5 is a cross-sectional view of the fluid pressure apparatus in a second operating position.

DETAILED DESCRIPTION OF THE EMBODIMENTS

Figure 1:
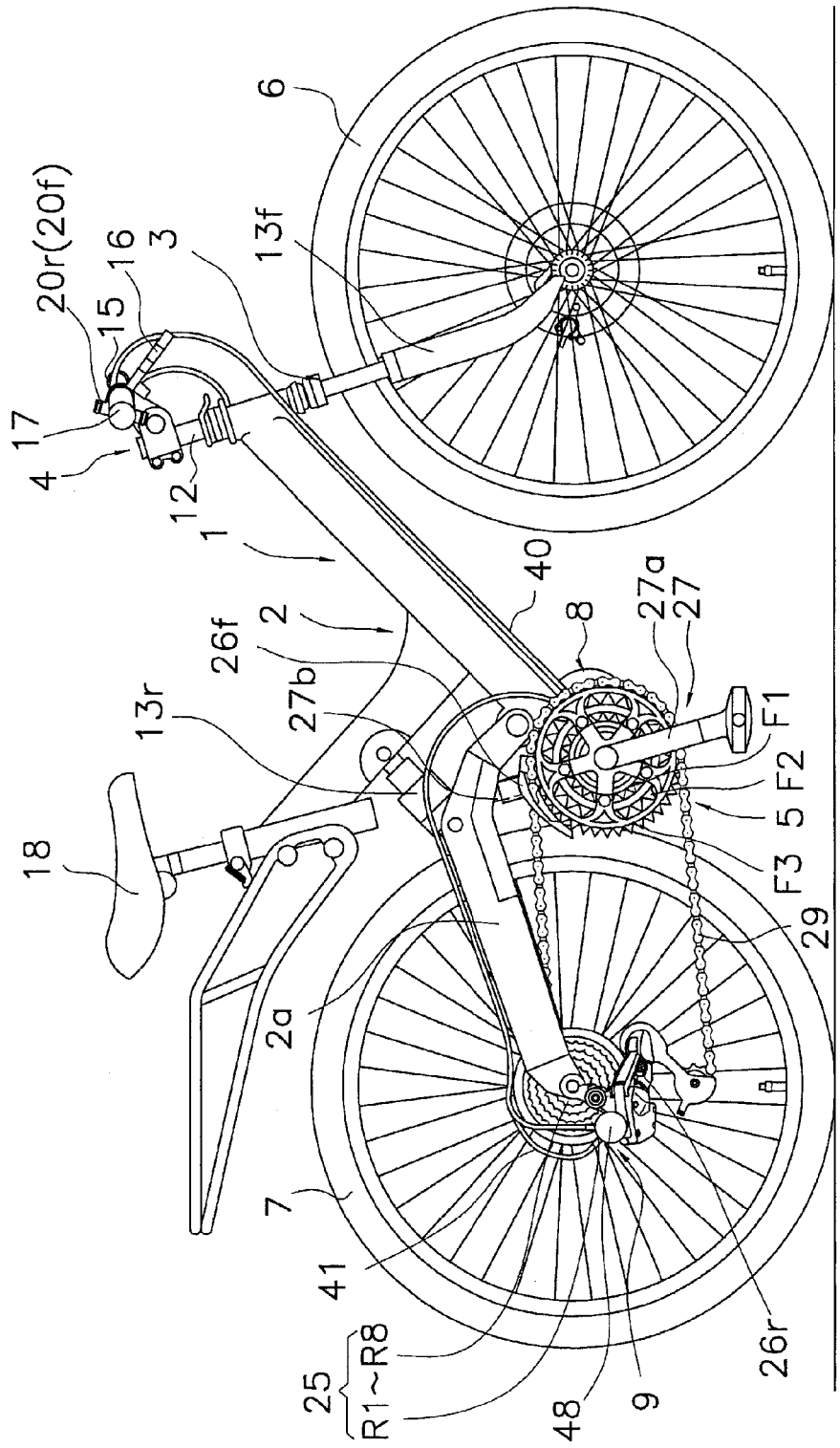
FIG. 1 is a side view of a bicycle equipped with an embodiment of a fluid pressure apparatus.

FIG. 1 is a side view of a particular embodiment of a bicycle 1. Bicycle 1 is a mountain bicycle comprising a frame body 2 having a swing arm 2a with a rear suspension 13r, a front fork 3 rotatably mounted to the front of frame body 2, a front suspension 13f mounted with front fork 3, a handlebar assembly 4 mounted to the upper part of fork 3, a front wheel 6 rotatably attached to the lower part of fork 3, a rear wheel 7 rotatably attached to the rear of swing arm 2a, and a drive unit 5. Frame body 2 comprises a plurality of irregularly-shaped pipes welded together. A saddle 18 is mounted to a middle portion of frame body 2, and front fork 3 is mounted so that front fork 3 rotates around an inclined axis.

Drive unit 5 comprises a chain 29, a pedal crank unit 27 with a right crank 27a and a left crank 27b, a front gear shift unit 8 attached to the middle of frame body 2, and a rear gift shift unit 9 mounted to the rear end of a swing arm 2a of frame body 2. In this embodiment, front gear shift unit 8 comprises three sprockets F1-F3 mounted to right crank 27a and a front derailleur 26f mounted to frame body 2. Rear gear shift unit 9 comprises a rear sprocket assembly 25 and a rear derailleur 26r mounted to the rear of swing arm 2a. Rear sprocket assembly 25 may have, for example, eight rear sprockets R1-R8 that rotate together with rear wheel 7. Front derailleur 26f moves to three operating positions to switch chain 29 among selected ones of the front sprockets F1-F3, and rear derailleur 26r moves to eight operating positions to switch chain 29 among selected ones of the rear sprockets R1-R8.

Handlebar assembly 4 comprises a handlebar stem 12 and a handlebar 15, wherein handlebar stem 12 is mounted to the upper part of front fork 3, and handlebar 15 is mounted to the forward end portion of handlebar stem 12. A brake lever 16 and a grip 17 are mounted on each end of handlebar 15. Shift control devices 20f and 20r also are mounted to opposite ends of handlebar 15, wherein shift control device 20f controls the operation of front derailleur 26f, and shift control device 20r controls the operation of rear derailleur 26r. Shift control devices 20f and 20r have the same construction, so only the construction of shift control device 20r will be described in detail.

Figure 2:
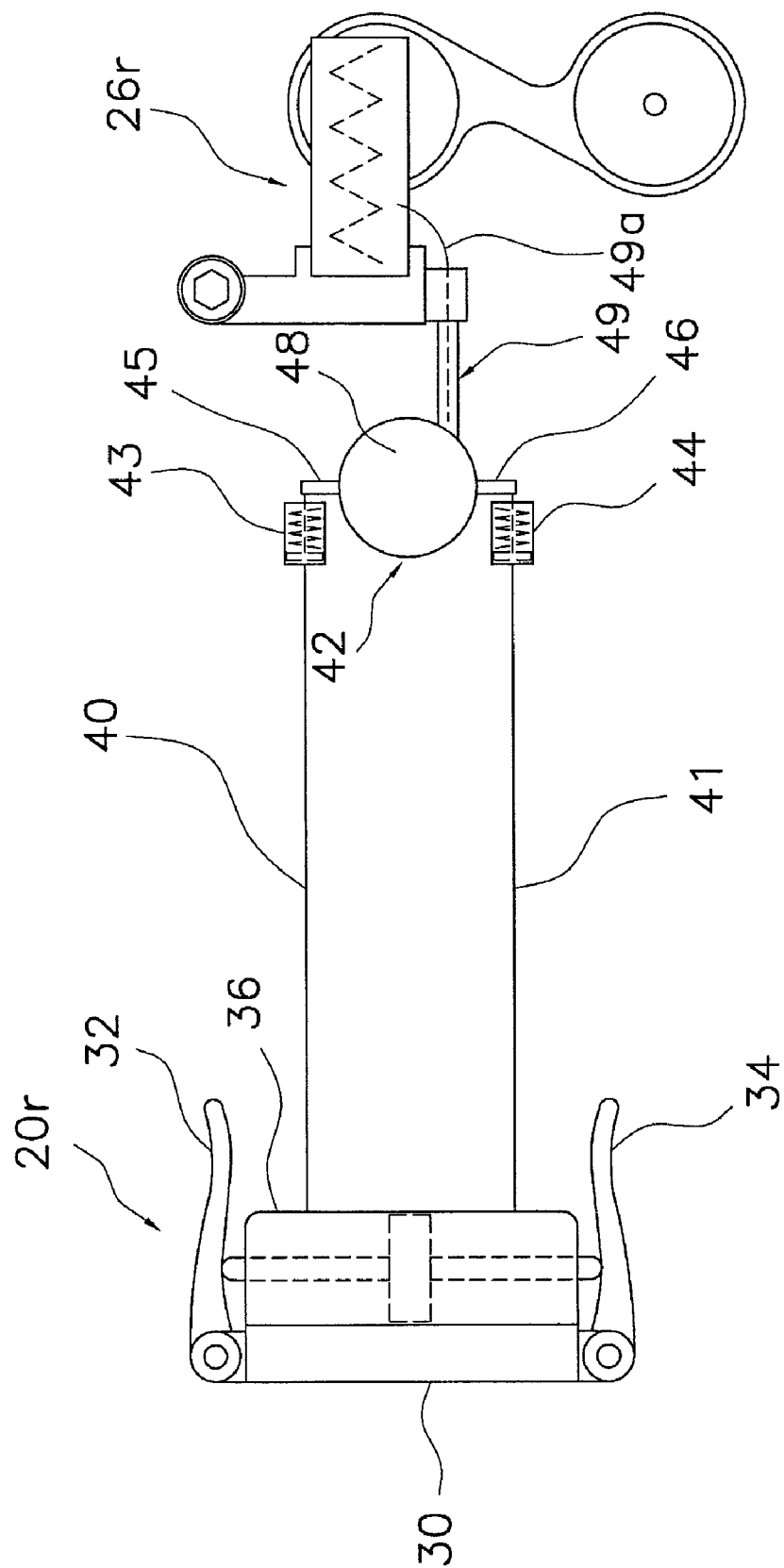
FIG. 2 is a schematic diagram of a hydraulically-operated gear shift system for the bicycle.

As shown schematically in FIG. 2, shift control device 20r is connected to a cable positioning mechanism 42 via hydraulic oil pipes 40 and 41. Cable positioning mechanism 42 includes a cable reel (not shown) stored in a housing 48, a pivoting cable positioning arm 45 and a pivoting cable releasing arm 46. Cable positioning arm 45 is operated by a hydraulic cylinder 43 that is connected to hydraulic oil pipe 40, and cable releasing arm 46 is operated by a hydraulic cylinder 44 that is connected to hydraulic oil pipe 41. In this embodiment, the cable reel winds an inner cable 49a of a gear shift cable 49 connected to rear derailleur 26r by one shift stage upon every operation of hydraulic cylinder 43 and cable positioning arm 45, and the cable reel unwinds inner cable 49a of gear shift cable 49 by one shift stage upon every operation of hydraulic cylinder 44 and cable releasing arm 46.

Figure 3:
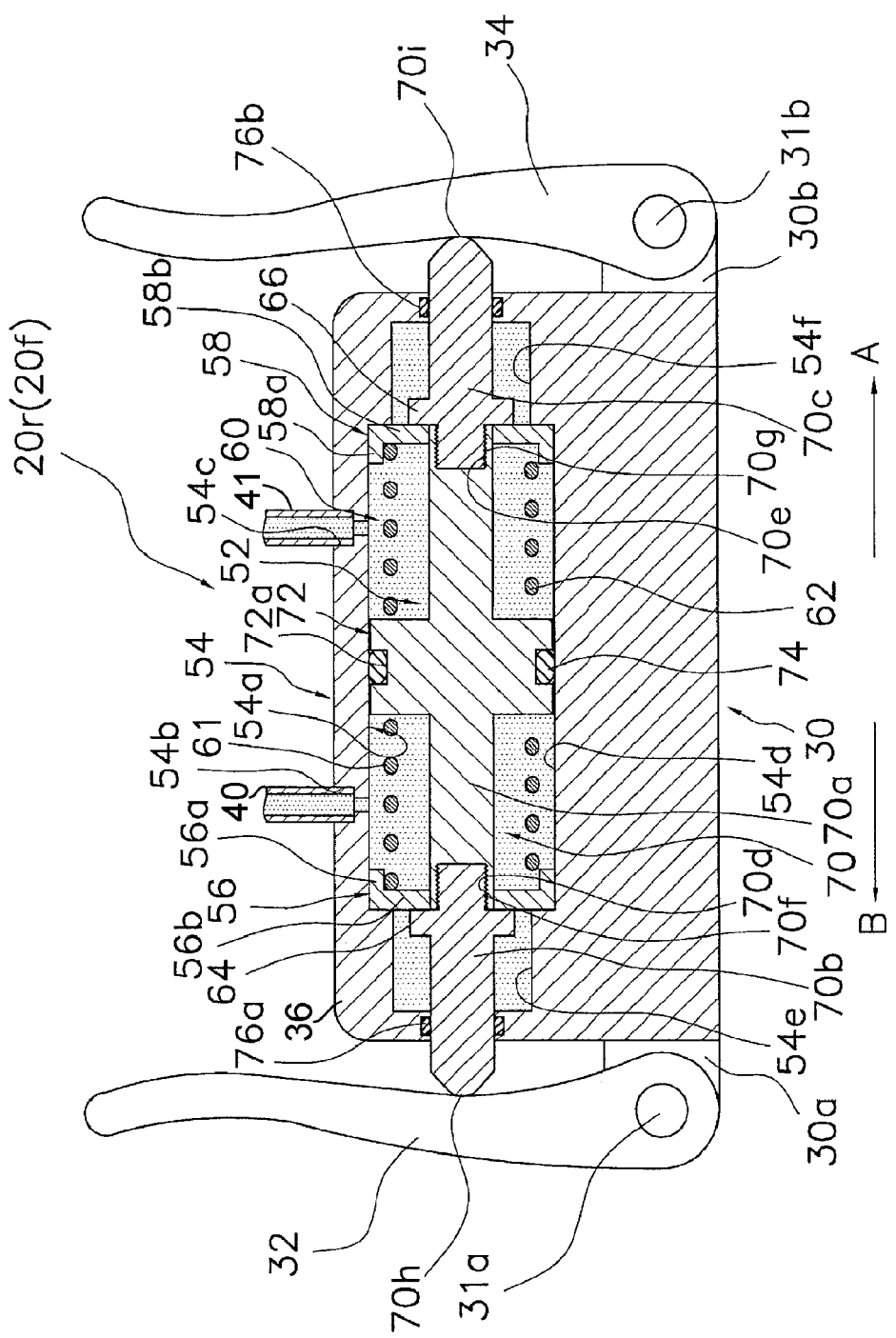
FIG. 3 is a cross-sectional view of an embodiment of a fluid pressure apparatus.

As shown in FIG. 3, shift control device 20r includes an attachment part 30 structured to be attached to handlebar 15 (FIG. 1) by a conventional band structure, a hydraulic cylinder unit 36a, a first operating member 32 pivotally mounted to a first pivot support 30a through a first pivot shaft 31a at a first side of attachment part 30, and a second operating member 34 pivotally mounted to a second pivot support 30b through a second pivot shaft 31b at a second side of attachment part 30.

Each of the first and second operating members 32 and 34 is a lever-shaped member having a proximal end and a distal end, wherein the proximal end is pivotably connected to its corresponding pivot support 30a or 30b, and the distal end is shaped to be manipulated by the rider's hand. Each of the first and second operating members 32 and 34 is biased inwardly by a basing member such as a torsion spring (not shown), for example. In other words, first operating member 32 is biased in the clockwise direction in FIG. 3, and second operating member 34 is biased in the counterclockwise direction in FIG. 3.

Hydraulic cylinder unit 36 comprises a housing 54 with a cylindrical chamber 54a dimensioned to receive a moving unit 52 therein so that moving unit 52 can move axially, first and second positioning members 56 and 58, a biasing unit 60, and first and second coupling elements 64 and 66. A working fluid such as hydraulic oil is disposed in chamber 54a, and first and second fluid ports 54b and 54c are formed in the wall of housing 54 for communicating the working fluid between chamber 54a and pipes 40 and 41, respectively. The working fluid is supplied from a reservoir tank, not shown. Chamber 54a has a columnar, large-diameter cylindrical part 54d and a pair of small-diameter cylindrical parts 54e and 54f formed on opposite sides of large-diameter cylindrical part 54d.

In this embodiment, moving unit 52 is an axially symmetrical unit that comprises a rod unit 70 and a piston 72 that is disposed in the middle of rod unit 70 so that individual rod members extend from opposite sides of piston 72. Piston 72 is located in large-diameter cylindrical part 54d between first and second fluid ports 54b and 54c. A piston ring 74 in the form of an O-ring seal, for example, is disposed in an annular groove 72a of piston 72.

Rod unit 70 comprises a central part 70a, a first end part 70b, and a second end part 70c. Central part 70a is formed integrally with piston 72. First end part 70b has an externally threaded portion 70f that screws into an internally threaded portion 70d formed at one end of central part 70a, and second end part 70c has an externally threaded portion 70g that screws into an internally threaded portion 70e formed at the opposite end of central part 70a. This structure facilitates assembly. First coupling element 64 and second coupling element 66 are integrally formed with first end part 70b and second end part 70c, respectively. Spherical contacting parts 70h and 70i are formed on the free ends of first and second end parts 70b and 70c for respectively contacting first and second operating members 32 and 34. In this embodiment, the free ends of first and second end parts 70b and 70c extend through small-diameter cylindrical parts 54e and 54f, respectively, and are exposed to the outside. Seal members 76a and 76b in the form of O-rings, for example, are disposed is small-diameter cylindrical parts 54e and 54f, respectively, for sealingly engaging the corresponding first and second end parts 70b and 70c.

First positioning member 56 is disposed in large-diameter cylindrical part 54d at the junction between large-diameter cylindrical part 54d and small-diameter cylindrical part 54e. First positioning member 56 comprises a first cylindrical part 56a and an integrally-formed first disk part 56b that extends radially inwardly from first cylindrical part 56a. First cylindrical part 56a slidably contacts the inner peripheral surface of large-diameter cylindrical part 54d, and first disk part 56b contacts the abutment formed by the transition between large-diameter cylindrical part 54d and small-diameter cylindrical part 54e. As a result of the abutment formed between large-diameter cylindrical part 54d and small-diameter cylindrical part 54e, first positioning member 56 can move freely from the home position shown in FIG. 3 towards a first direction A, but movement in a second direction B opposite direction A is restricted.

Second positioning member 58 is disposed in large-diameter cylindrical part 54d at the junction between large-diameter cylindrical part 54d and small-diameter cylindrical part 54f. Second positioning member 56 comprises a second cylindrical part 58a and an integrally-formed second disk part 58b that extends radially inwardly from second cylindrical part 58a. Second cylindrical part 58a slidably contacts the inner peripheral surface of large-diameter cylindrical part 54d, and second disk part 58b contacts the abutment formed by the transition between large-diameter cylindrical part 54d and small-diameter cylindrical part 54f. As a result of the abutment formed between large-diameter cylindrical part 54d and small-diameter cylindrical part 54f, second positioning member 58 can move freely from the home position shown in FIG. 3 towards second direction B, but movement in first direction A is restricted.

Biasing unit 60 comprises a first spring member 61 and a second spring member 62, wherein first spring member 61 is disposed around the portion of rod part 70 to the left of piston 72, and second spring member 62 is disposed around the portion of rod part 70 to the right of piston 72. Each spring member 61 and 62 may be a coil spring, for example. A first (right) end of spring 61 contacts a first (left) side of piston 72, and a second (left) end of spring 61 contacts first disk part 56b of first positioning member 56. Similarly, a first (left) end of spring 62 contacts a second (right) side of piston 72, and a second (right) end of spring 62 contacts second disk part 58b of second positioning member 58. As a result, biasing unit 60 biases first positioning member 56 and second positioning member 58 away from piston 72. The cylindrical shapes of first cylindrical part 56a second cylindrical part 58a ensure smooth movement of first positioning member 56 and second positioning member 58 in accordance with the biasing forces of biasing unit 60.

First coupling element 64 has a diameter that is greater than a diameter of the portion of central part 70a that supports first disk part 56b of first positioning member 56. As a result, first coupling element 64 contacts first disk part 56b of first positioning member 56 when first positioning member 56 is in the position shown in FIG. 3. Similarly, second coupling element 66 has a diameter that is greater than a diameter of the portion of central part 70a that supports second disk part 58b of second positioning member 58. As a result, second coupling element 66 contacts second disk part 58b of second positioning member 58 when second positioning member 58 is in the position shown in FIG. 3.

Figure 4:
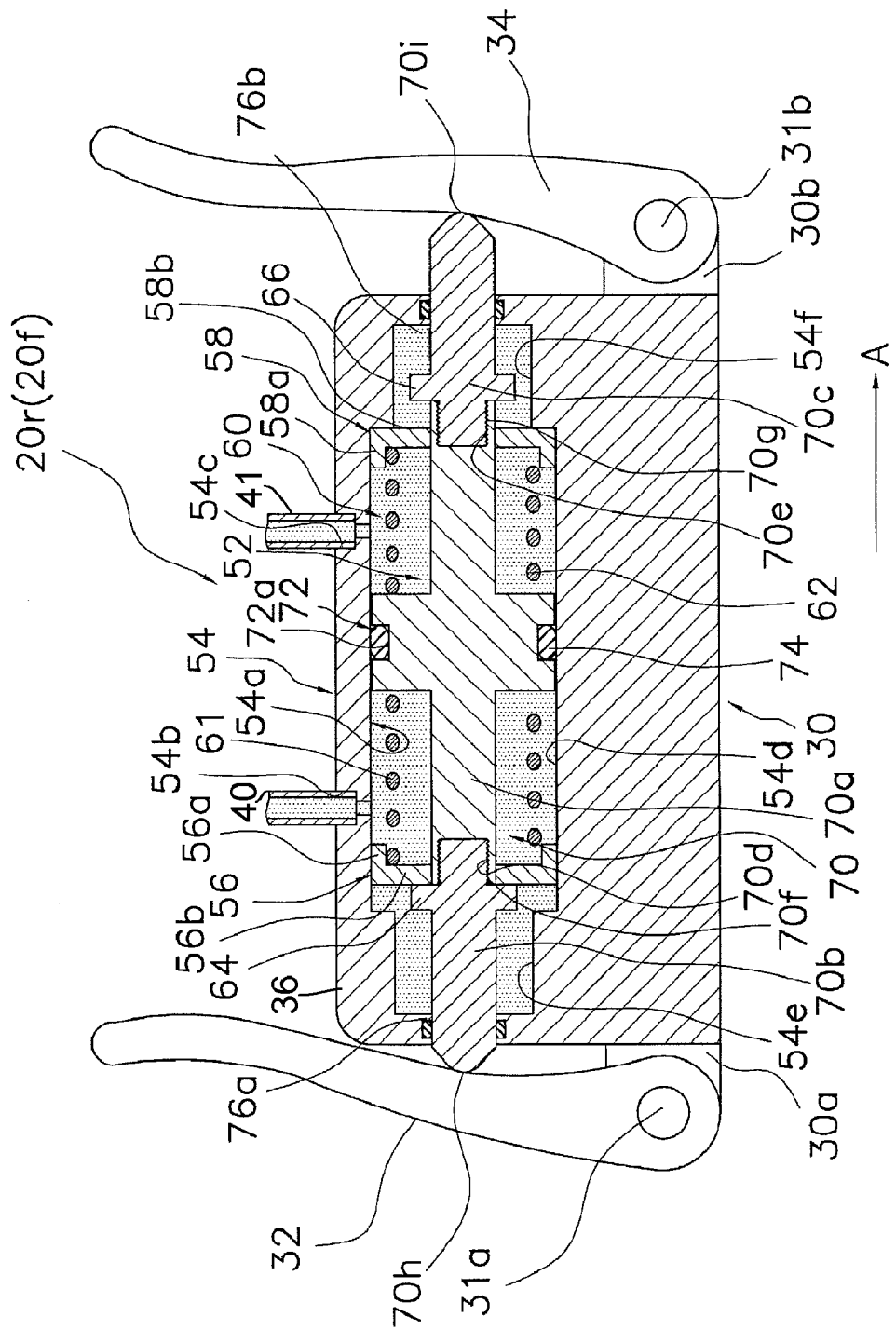
FIG. 4 is a cross-sectional view of the fluid pressure apparatus in a first operating position.

As shown in FIG. 4, rotating first operating member 32 clockwise causes first coupling element 64 on first end part 70b of rod unit 70 to press first positioning member 56 to move in the first direction A together with piston 72 and the remainder of rod unit 70. As a result, the working fluid flows in through first fluid port 54b and out through second fluid port 54b. The flow of working fluid through second fluid port 54b is communicated through hydraulic oil pipe 41 to operate hydraulic cylinder 44 and cable releasing arm 46 of cable positioning mechanism 42, thereby causing rear derailleur 26r to shift up one gear, for example. During this time, second spring 62 is compressed. When the rider releases first operating part 32, second spring 62 presses piston 72 in the second direction B until first positioning member 56 returns to the home position shown in FIG. 3, thereby setting piston 72 into a neutral piston home position.

As shown in FIG. 5, rotating second operating member 34 counterclockwise causes second coupling element 66 on second end part 70c of rod unit 70 to press second positioning member 58 to move in the second direction B together with piston 72 and the remainder of rod unit 70. As a result, the working fluid flows in through second fluid port 54c and out through first fluid port 54b. The flow of working fluid through first fluid port 54b is communicated through hydraulic oil pipe 40 to operate hydraulic cylinder 43 and cable positioning arm 45 of cable positioning mechanism 42, thereby causing rear derailleur 26r to shift down one gear, for example. During this time, first spring 61 is compressed. When the rider releases second operating part 34, first spring 61 presses piston 72 in the first direction A until second positioning member 58 returns to the home position shown in FIG. 3, thereby setting piston 72 in the neutral piston home position.

In this embodiment, it should be apparent that first and second positioning members 56 and 58 are biased by first and second springs members 61 and 62, respectively, in a direction such that first and second positioning members 56 and 58 separate outwardly from piston 72, and the outward movement of first and second positioning members 56 and 58 is restricted by the abutments formed by the transitions between large-diameter cylindrical part 54d and small-diameter cylindrical parts 54e and 54f. Since first and second coupling elements 64 and 66 contact first and second positioning members 56 and 58, and since first and second coupling elements 64 and 66 are integrally formed with rod unit 70 and piston 72, the piston home position is set accurately regardless of any difference in biasing force from the working fluid or from springs 61 and 62.

While the above is a description of various embodiments of inventive features, further modifications may be employed without departing from the spirit and scope of the present invention. For example, the described fluid pressure apparatus supplied working fluid to a shift operating part for a bicycle, but the teachings herein may be applied to an actuator such as a hydraulic cylinder for a positioning mechanism, to a front or rear suspension adjusting device, etc. The size, shape, location or orientation of the various components may be changed as desired. Components that are shown directly connected or contacting each other may have intermediate structures disposed between them. Separate components may be combined, and vice versa. The functions of one element may be performed by two, and vice versa. The function of one element may be performed by another, and functions may be interchanged among the elements. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Terms of degree such as "substantially," "about" and "approximately" as used herein include a reasonable amount of deviation of the modified term such that the end result is not significantly changed. For example, such terms may include a deviation of at least ±5% of the modified term as long as such a deviation would not negate the meaning of the word it modifies. Thus, the scope of the invention should not be limited by the specific structures disclosed or the apparent initial focus or emphasis on a particular structure or feature.

What is claimed is:

1. A fluid pressure apparatus for a bicycle comprising:
a piston;
a housing with a chamber dimensioned to receive the piston therein so that the piston can move axially;
first and second fluid ports in fluid communication with the chamber;
wherein the first and second fluid ports are located so that the piston is disposed between the first and second fluid ports when the piston is disposed in a piston home position;
a first positioning element that moves from a first home position towards a first direction;
a first biasing element that biases the first positioning element towards the first home position; and
a first coupling element, wherein the first coupling element couples the first positioning element to move with the piston in the first direction, and wherein the first positioning element and the piston move relative to each other when the piston moves in an opposite second direction.

2. The apparatus according to claim 1 wherein the first biasing element biases the first positioning element towards the first coupling element.

3. The apparatus according to claim 1 wherein the first biasing element biases the first positioning element in a direction away from the piston.

4. The apparatus according to claim 1 further comprising a second biasing element that biases the piston in a direction towards the first positioning element.

5. The apparatus according to claim 1 further comprising an extending member coupled between the piston and the first positioning element, wherein the first coupling element comprises an abutment disposed on the extending member for contacting an abutment disposed on the first positioning element.

6. The apparatus according to claim 5 wherein the abutment disposed on the extending member contacts the abutment disposed on the first positioning element when the first positioning element is disposed at the first home position.

7. The apparatus according to claim 6 wherein the first positioning element contacts an abutment disposed on the housing when the first positioning element is disposed at the first home position.

8. The apparatus according to claim 7 wherein the first positioning element is disposed within the chamber.

9. The apparatus according to claim 1 further comprising:
a second positioning element that moves from a second home position towards a second direction;
a second biasing element that biases the second positioning element towards the second home position; and
a second coupling, wherein the second coupling element couples the second positioning element to move with the piston in the second direction, and wherein the second positioning element and the piston move relative to each other when the piston moves in the first direction;
wherein the piston is disposed at the piston home position when the first positioning element is disposed at the first home position and the second positioning element is disposed at the second home position.

10. The apparatus according to claim 9 wherein the first biasing element biases the first positioning element towards the first coupling element, and wherein the second biasing element biases the second positioning element towards the second coupling element.

11. The apparatus according to claim 9 wherein the first biasing element biases the first positioning element in a direction away from the piston, and wherein the second biasing element biases the second positioning element in a direction away from the piston.

12. The apparatus according to claim 9 further comprising:
a first extending member coupled between the piston and the first positioning element; and
a second extending member coupled between the piston and the second positioning element;
wherein the first coupling element comprises a first abutment disposed on the first extending member for contacting a first abutment disposed on the first positioning element; and
wherein the second coupling element comprises a second abutment disposed on the second extending member for contacting a second abutment disposed on the second positioning element.

13. The apparatus according to claim 12 wherein the first abutment disposed on the first extending member contacts the first abutment disposed on the first positioning element when the first positioning element is disposed at the first home position, and wherein the second abutment disposed on the second extending member contacts the second abutment disposed on the second positioning element when the second positioning element is disposed at the second home position.

14. The apparatus according to claim 13 wherein the first positioning element contacts a first abutment disposed on the housing when the first positioning element is disposed at the first home position, and wherein the second positioning element contacts a second abutment disposed on the housing when the second positioning element is disposed at the second home position.

15. The apparatus according to claim 14 wherein the first positioning element and the second positioning element are disposed within the chamber.

16. The apparatus according to claim 15 wherein the first positioning element comprises:
a first cylindrical part that slidably contacts an inner peripheral surface of the chamber; and
a first disk part that contacts the first abutment on the first extending member; and
wherein the second positioning element comprises:
a second cylindrical part that slidably contacts an inner peripheral surface of the chamber; and
a second disk part that contacts the second abutment on the second extending member.

17. The apparatus according to claim 15 wherein the first extending member comprises a first rod, wherein the second extending member comprises a second rod, and wherein the piston is integrally formed with the first rod and the second rod.

18. The apparatus according to claim 17 wherein the first rod has a first free end structured to receive a pressing force by a first operating device, and wherein the second rod has a second free end structured to receive a pressing force by a second operating device.

19. The apparatus according to claim 15 further comprising:
a mounting member structured to attach the housing to a bicycle;
a first operating member for providing the pressing force to the first free end of the rod; and
a second operating member for providing the pressing force to the second free end of the rod.

20. The apparatus according to claim 19 wherein the first operating member comprises a first lever, and wherein the second operating member comprises a second lever.

* * * * *